Aug. 15, 1939.   E. A. MURPHY ET AL   2,169,847
PRODUCTION OF RUBBER STRUCTURES AND PROCESS OF MAKING THE SAME
Filed March 18, 1937
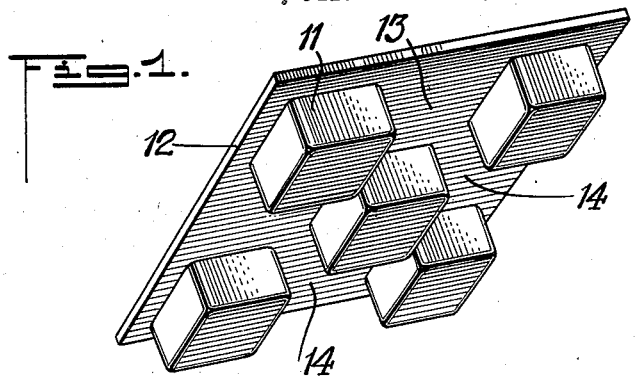
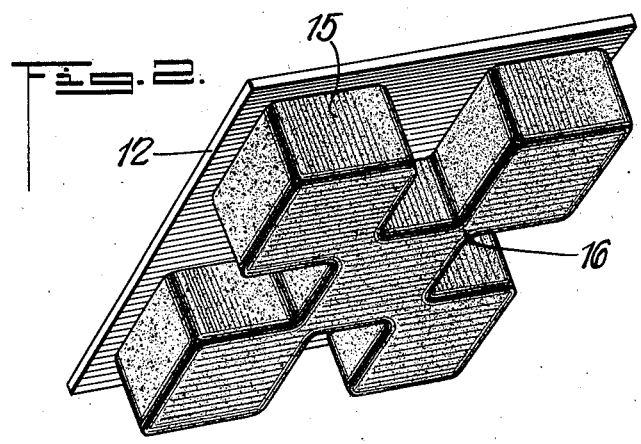
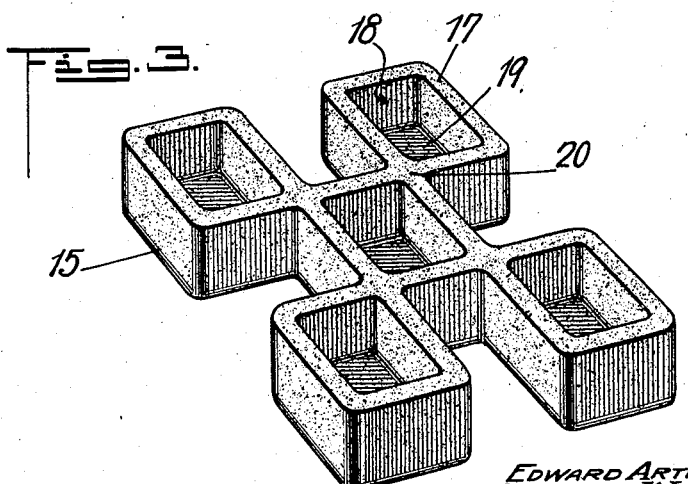
INVENTORS
EDWARD ARTHUR MURPHY.
GEOFFREY WILLIAM TROBRIDGE.
BY    ALBERT NELSEN WARD.
Benj. T. Rauber ATTORNEY.

Patented Aug. 15, 1939

2,169,847

UNITED STATES PATENT OFFICE

2,169,847

PRODUCTION OF RUBBER STRUCTURES AND PROCESS OF MAKING THE SAME

Edward Arthur Murphy, Wylde Green, Birmingham, Geoffrey William Trobridge, Sutton Coldfield, and Albert Nelson Ward, Alum Rock, Birmingham, England, assignors to Dunlop Rubber Company Limited, London, England, a British company Application March 18, 1937, Serial No. 131,630
In Great Britain June 2, 1936

6 Claims. (Cl. 18—58)

Our invention relates to improvements in rubber structures produced from aqueous dispersions, and to methods of producing rubber articles from aqueous dispersions. Our invention relates more particularly to the production of articles from foamed latex or other dispersions of corresponding stiffness or viscosity.

In certain articles of foamed latex rubber as, for example, upholstery or cushions, open cavities are provided extending upwardly and separated by intersecting partition walls. Heretofore these cavities and their partition walls have commonly been formed by pouring or otherwise molding a mass or body of foamed latex into a mold having suitable spaced cores projecting upwardly therein. The relatively high viscosity of frothed latex mixings, however, imposes a limit on the closeness of spacing of the cores and, accordingly, on the thinness of the intervening partition walls inasmuch as the latex may not be able to flow into the spaces between the cores if they are too closely spaced.

This limitation on the thickness or thinness of the partition walls, or the closeness and spacing of the cores and of the cavities formed by them, is removed by our present invention which provides a structure and a manner of forming each in which the thickness of the walls may be independent of the spacing of the cores or former elements.

In our invention we form certain of the cavities by the presence of cores, while other cavities are formed by being enclosed in walls of the latex or foamed latex formed on the former and joined by connecting webs. For example, if a former is dipped into a body of foamed latex or similar dispersion, a layer of the latter will be deposited on the surfaces of the former, and if a number of such formers be so arranged that at certain places they approach sufficiently close to cause the intervening distance to be spanned by a web of the latex, spaces will be formed between the deposits on the several spaced formers. For example, rectangular formers may be so spaced that their corners are sufficiently close to be spanned by webs of the latex as they are dipped into and withdrawn from a mass of foamed latex, and thus form cavities not only about the cores, but between them. Similarly, circular, triangular, hexagonal or other shaped formers may be so spaced as to form cavities about and between the formers.

The nearest parts of adjacent coatings can be connected in several ways. If the nearest parts of adjacent former elements are very close together the coatings will contact along their edges, simply, and without the formation of webs or ribs. It is only if the former elements are some distance apart that connecting webs or ribs are formed. If, however, the nearest parts of adjacent former elements are separated too far, the required webs or ribs may only form after the thickness of the coatings has been allowed to grow, as by a multiple dipping operation.

It is preferable to have the forming elements in parallel relationship and of substantially uniform cross-section.

According to the present invention, the process for the production of rubber structures provided with the two types of cavities aforesaid from aqueous dispersions of or containing rubber, comprises applying the aqueous dispersions of or containing rubber to a number of former elements mounted and spaced in such a way that the coating on any one former element will be connected as by webs or ribs to any one or more of the neighboring coatings.

According to one preferred embodiment of the present invention, the process for the production of sponge-like or cellular rubber upholstery units provided with the two types of cavities aforesaid from foamed aqueous dispersions of or containing rubber comprises applying the foamed aqueous dispersions to a number of former elements mounted and spaced in such a way that the coating on any one former element will be connected as by webs or ribs of the foamed dispersion to any one or more of the neighboring coatings.

According to another preferred embodiment of the present invention, the process for the production of sponge-like or cellular rubber units provided with the two types of cavities aforesaid from foamed aqueous dispersions of or containing rubber comprises dipping into foamed aqueous dispersions, having a suitable low surface tension, a number of former elements mounted and spaced in such a way that the coating on any one former element will be connected as by webs or ribs of the foamed dispersion to any one or more of the neighboring coatings.

Where a fairly high lateral stability is desired in the final structure, it is preferred to arrange a number of former elements of square cross-section, but other shapes or combinations of shapes may be used as, for example, former elements having triangular and hexagonal cross-sections.

The process of the present invention and the article produced thereby are illustrated by way of example in the accompanying drawing, in which, Fig. 1 is a perspective view of a former for dipping into a mass of foamed latex, or other aqueous dispersion of rubber, to deposit a mass of latex thereon; Fig. 2 is a similar view showing the former after dipping and having an adhering coating of foamed latex or dispersion, and Fig. 3 is a perspective view of the deposited latex after it has been removed from the former.

In the embodiment of the invention shown in the drawing, it has been illustrated as applied to rectangular formers spaced in a checker-board manner, but it will be understood that other shapes may be employed.

As shown in the drawing, a number of shallow rectangular projections 11 are mounted on the under side of a base 12. The projections 11 are spaced in a checker-board manner so as to leave alternate spaces 13 between each pair of projections, and are so spaced that there will be a space 14 between the opposed corners of each pair of projections.

When the projections 11 are dipped into a mass of foamed latex, a deposit 15 is formed on each of the projections 11, and by suitably selecting the space 14, a web 16 of latex will span the deposits between diagonally placed projections. When the deposit is gelled, or gelled and vulcanized, it is removed from the form and there will therefore be left walls 17 of foamed rubber encircling spaces 18 left upon the removal of the projections 11, and a bottom wall 19 connecting the walls 17. There will also be a connecting web 20 between the side walls 17 of each hollow space 18 and the side walls of a similar structure arranged diagonally thereto or, in other words, there are a number of spaced hollow masses of foamed rubber connected with webs in such a manner as to form other spaces.

It will be apparent that the inner surfaces of the walls 17, that is, the walls facing the openings 18, will correspond to the surfaces of the former projections 11, whereas the outer surfaces will have the less regular surfaces characteristic of dipped latex rubber. Also, the bottoms of the openings 18 are closed by the bottom walls 19.

Insofar as the preferred dipping embodiment of the invention is concerned, it may be noted that the thickness of each wall is determined by such factors as stability, viscosity and solid content of the aqueous dispersions as in ordinary dipping processes and is almost independent of the size and spacing of the former elements. Furthermore, any of the usual dipping methods for the deposition of rubber from rubber latex can be used as, for example, dipping a former one or more times into a latex mixing and coagulating each separate coating by drying or by means of a coagulant, dipping a hot former into a heat-labilized latex mixing, dipping a former wetted with a coagulant into a rubber dispersion, or dipping a former into a mixing so labilized as to coagulate spontaneously after a predetermined time interval.

The dispersions comprise natural or artificial aqueous dispersions of rubber or similar vegetable resins such as gutta percha, balata with or without the addition of aqueous dispersions or rubber-like substances such as the so-called synthetic rubbers, mineral rubber or rubber substitutes such as factices or rubber reclaim, or rubber waste or oils, for example, rape oil or vulcanized oils or cellulose esters or proteins, for example, casein.

The main dispersions may be concentrated and/or prevulcanized and/or compounded, or compounded and subsequently concentrated.

The compounding ingredients may be chosen from vulcanizing agents such as sulphur, and organic accelerators, fillers and reinforcing agents such as whiting, clay, barium sulphate, lithopone, lamp black, gas black, zinc oxide or powdered ebonite or vulcanite, coloring matters, preservatives or softeners.

Compounded concentrates such as are described in Patent 1,846,164 are particularly suitable for use.

Aqueous dispersions of synthetic rubber with or without any one or more of the hereinbefore mentioned compounding ingredients may also be used.

The reversible frothed aqueous emulsions or dispersions described in Patent 1,852,447 and in British Patent 332,526 can also be used.

An example of carrying the invention into effect is as follows:

A former is provided with a number of parallel prismatic former elements of square cross-section which are dipped into a frothed latex mixing of the following composition—

| | Parts by weight |
|---|---|
| Rubber | 100 |
| Ammonium oleate | 0.5 |
| Sulphur | 2.0 |
| Zinc diethyl dithiocarbamate | 1.0 |
| Zinc oxide | 3.0 |
| Agerite white | 0.5 |

The total solid content of the mixing is 57%.

The former elements are so spaced in relation one to another that films of foamed aqueous dispersion remain connecting the deposits of foamed rubber latex after removing the former elements from the body of the dispersion.

After removing the former elements from the frothed dispersion the deposit is coagulated by spraying it with a 10% solution of acetic acid in alcohol. The dipping operation into the frothed latex mixing with subsequent coagulation can be repeated as many times as desired. The deposit is finally vulcanized in boiling water, stripped from the former elements and dried in warm air.

To improve the outer appearance of the sponge rubber structure, it may be desirable temporarily to surround the outer former elements of the former with a sheet of material, e. g., a sheet of paper, deposit and coagulate an aqueous dispersion thereon, carefully slip off the temporary sheet of material from the former in such a way as to leave the deposit formed on it in direct contact with the rubber deposits on the outer former elements and the respective connecting coagulated webs and apply pressure, usually quite light, to unite the outer deposit to the deposits formed on the former elements and to the connecting coagulated webs.

What we claim is—

1. A method for the production of porous rubber structures from foamed latex which comprises dipping spaced projections into a mass of foamed latex to form deposits on the side walls of said projections and to join said deposits on one projection with those on the others to form a continuous structure.

2. A methd of forming a hollow porous structure from foamed aqueous dispersions which comprises arranging a number of projections in spaced relation with parts of one projection in close proximity to another projection to form a narrow space therebetween, and dipping said projections thus spaced into a foamed aqueous dispersion of rubber to build up a deposit on the side walls of said projections and to bridge the narrow spaces between said projections, while leaving wider spaces between said projections free of deposited aqueous dispersion.

3. A method for producing cellular rubber units having open cavities from foamed aqueous dispersions of rubber which comprises dipping spaced former elements successively into foamed latex to build up deposits thereon by successive dipping and with the deposits on one former contacting with those on another to form cavities between said formers.

4. A method for producing rubber structures having open cavities which comprises applying a layer of aqueous rubber dispersion to the surfaces of spaced former elements to form rubber deposits thereon, joining the deposits on one former with those on another former to enclose open cavities in the spaces between formers.

5. A method for producing cellular rubber units having open cavities from foamed aqueous dispersions of rubber which comprises depositing a layer of foamed aqueous dispersion on spaced former elements, joining the layer on one former to the layers of adjacent former elements to leave open spaces between the former elements.

6. A method for producing cellular rubber units having open cavities from foamed aqueous dispersions of rubber which comprises filling the cavities between the surfaces of former elements with foamed aqueous dispersions of rubber and permitting the foamed dispersion in the spaces between formers to run out of said spaces and leave a deposited layer of foam on the surfaces of said formers, and setting said foam to a porous cellular structure.

EDWARD ARTHUR MURPHY.
GEOFFREY WILLIAM TROBRIDGE.
ALBERT NELSON WARD.